United States Patent
Futaki et al.

(10) Patent No.: US 11,792,696 B2
(45) Date of Patent: Oct. 17, 2023

(54) RADIO ACCESS NETWORK NODE, RADIO TERMINAL, AND METHOD THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 126 days.

(21) Appl. No.: 17/419,643

(22) PCT Filed: Oct. 31, 2019

(86) PCT No.: PCT/JP2019/042921
§ 371 (c)(1),
(2) Date: Jun. 29, 2021

(87) PCT Pub. No.: WO2020/144919
PCT Pub. Date: Jul. 16, 2020

(65) Prior Publication Data
US 2022/0086704 A1    Mar. 17, 2022

(30) Foreign Application Priority Data

Jan. 11, 2019  (JP) .................................. 2019-003563

(51) Int. Cl.
| | |
|---|---|
| *H04W 4/00* | (2018.01) |
| *H04W 36/00* | (2009.01) |
| *H04W 76/15* | (2018.01) |
| *H04W 36/36* | (2009.01) |

(52) U.S. Cl.
CPC ....... *H04W 36/0027* (2013.01); *H04W 36/36* (2013.01); *H04W 76/15* (2018.02)

(58) Field of Classification Search
CPC ......... H04W 36/0011; H04W 36/0016; H04W 36/0027; H04W 36/0069; H04W 36/0083;
(Continued)

(56) References Cited

U.S. PATENT DOCUMENTS

2017/0318505 A1  11/2017 Park et al.
2018/0324883 A1  11/2018 Wu
(Continued)

FOREIGN PATENT DOCUMENTS

EP        3313135 A1    4/2018
WO    2019/184622 A1   10/2019
(Continued)

OTHER PUBLICATIONS

International Search Report for PCT Application No. PCT/JP2019/042921, dated Jan. 21, 2020.
(Continued)

Primary Examiner — Matthew W Genack

(57) ABSTRACT

A secondary node (2) transmits to a radio terminal (3), via a master node (1), a first RRC message indicating an execution condition of a conditional primary cell change of a primary cell of a secondary cell group from a first cell to a second cell. In addition, the secondary node (2) receives, via the master node (1), a second RRC message that is transmitted from the radio terminal (3) in response to a satisfaction of the execution condition. This contributes to, for example, allowing the secondary node to be aware of a satisfaction of an execution condition of a conditional PSCell change where RRC signaling between the secondary node and the radio terminal is performed via the master node.

20 Claims, 9 Drawing Sheets

(58) Field of Classification Search
CPC ..... H04W 36/34; H04W 36/36; H04W 36/38; H04W 76/00; H04W 76/10; H04W 76/15; H04W 76/20
See application file for complete search history.

(56) References Cited

U.S. PATENT DOCUMENTS

| | | | |
|---|---|---|---|
| 2018/0332651 A1 | 11/2018 | Hsieh | |
| 2019/0069333 A1* | 2/2019 | Kim | H04W 76/15 |
| 2019/0116536 A1* | 4/2019 | Xu | H04W 52/0206 |
| 2020/0154333 A1* | 5/2020 | Paladugu | H04B 7/0602 |

FOREIGN PATENT DOCUMENTS

| | | |
|---|---|---|
| WO | 2020/128848 A1 | 6/2020 |
| WO | 2021/057885 A1 | 4/2021 |

OTHER PUBLICATIONS

Intel Corporation, "Discussion of conditional handover", R2-1816691, 3GPP TSG RAN WG2 Meeting #104, Spokane, WA, USA, Nov. 12-16, 2018.

MediaTek Inc., "Conditional Handover Procedures", R2-1816959, 3GPP TSG RAN WG2 Meeting #104, Spokane, WA, USA, Nov. 12-16, 2018.

3GPP TS 37.340 V15.3.0, Sep. 25, 2018, pp. 23-30, 39.

NEC, Reuse of conditional handover for SCG change in NR-DC, 3GPP TSG RAN WG2#105bis R2-1904069, Mar. 29, 2019.

JP Office Action for JP Application No. 2020-565592, dated Jun. 28, 2022 with English Translation.

Vivo, "Text proposal for conditional PSCell addition and change", 3GPP TSG RAN WG2 #107bis R2-1912343, Oct. 4, 2019, pp. 1-2.

Extended European Search Report for EP Application No. EP19908379.1 dated Feb. 7, 2022.

ZTE Corporation, "[Offline discussion #19] TP on PSCell change clarification and removal of SCG Change", 3GPP Draft; R2-1714176, Dec. 2, 2017.

CATT, "Conditional PScell addition/ change", 3GPP Draft; R2-1912133, Oct. 3, 2019.

Lenovo et al., "Conditional handover in NR system",3GPP Draft; R2-1803044, Mar. 2, 2018 (Mar. 2, 2018).

Indian Office Action for IN Application No. 202117030930 dated Mar. 29, 2022.

JP Office Action for JP Application No. 2022-114757, dated May 30, 2023 with English Translation.

* cited by examiner

RADIO ACCESS NETWORK NODE, RADIO TERMINAL, AND METHOD THEREFOR

This application is a National Stage Entry of PCT/JP2019/042921 filed on Oct. 31, 2019, which claims priority from Japanese Patent Application 2019-003563 filed on Jan. 11, 2019, the contents of all of which are incorporated herein by reference, in their entirety.

TECHNICAL FIELD

The present disclosure relates to a radio communication system and, in particular, to mobility of radio terminals.

BACKGROUND ART

Non Patent Literatures 1 and 2 disclose a conditional handover (CHO) being discussed in the 3GPP. In some implementations for CHO, a source radio access network (RAN) node (e.g., eNodeB (eNB)) transmits a handover command including a handover execution condition (e.g., threshold) to a radio terminal (e.g., User Equipment (UE)). The radio terminal maintains the connection with the source RAN node even after receiving the handover command, and initiates access to the target RAN node as soon as the condition configured by the handover command is satisfied. That is, the conditional handover (CHO) is different from existing handovers in that the radio terminal initiates access to the target cell not in response to receiving the handover command, but in response to the satisfaction of the condition configured by the handover command.

The CHO can improve the reliability of delivery of the handover command to the UE by early event triggering (i.e., lowering a threshold which triggers a measurement report by the radio terminal). This allows the CHO to reduce a handover failure rate.

In CHO, a configuration of a plurality of candidate target cells may be sent to the radio terminal. The candidate targets cell may be referred to as potential target cells. For example, the radio terminal receives a handover command including configurations of a plurality of candidate target cells and a CHO execution threshold from the source RAN node (e.g., eNB). The radio terminal measures the configured candidate target cells and, when the measurement in any candidate target cell meets the CHO execution threshold, initiates access to this candidate cell.

CITATION LIST

Non Patent Literature

[Non Patent Literature 1] Intel Corporation, "Discussion of conditional handover", R2-1816691, 3GPP TSG RAN WG2 Meeting #104, Spokane, WA, USA, Nov. 12-16, 2018

[Non Patent Literature 2] MediaTek Inc., "Conditional Handover Procedures", R2-1816959, 3GPP TSG RAN WG2 Meeting #104, Spokane, WA, USA, Nov. 12-16, 2018

SUMMARY OF INVENTION

Technical Problem

The inventors have studied applying conditional mobility operations similar to the conditional handover to a cell change (PSCell change) of a primary cell (Primary SCG Cell (PSCell)) of a Secondary Cell Group (SCG) of a Dual Connectivity (DC) and found various problems.

The PSCell is, in other words, a Special Cell (SpCell) of the SCG. The UE performs a random access to the PSCell when it performs a handover procedure (or a Reconfiguration with Sync procedure). The SCG is a group of serving cells associated with a Secondary Node (SN) of the DC and includes a SpCell (i.e., PSCell) and optionally one or more Secondary Cells (SCells).

The PSCell Change is an example of a procedure which involves the Reconfiguration with sync procedure. Accordingly, the conditional PSCell change can be referred to as a conditional Reconfiguration with sync (for PSCell change).

As an example, consider a case where an SN uses the SN initiated SN Modification with MN involvement procedure for the PSCell change. In this case, RRC signaling between the SN and the UE for the conditional mobility (e.g., conditional PSCell change) is transmitted via a Signaling Radio Bearer (SRB) of a Master Cell Group (MCG). The MCG is a group of serving cells served by a Master Node (MN) of the DC. In this case, it is not clear how the SN knows a satisfaction of an execution condition of the PSCell change (or an initiation of the conditional mobility).

One of the objects to be attained by embodiments disclosed herein is to provide apparatuses, methods, and programs that contribute to allowing an SN to be aware of a satisfaction of an execution condition of a conditional PSCell change (or an initiation of the conditional PSCell change). It should be noted that this object is merely one of the objects to be attained by the embodiments disclosed herein. Other objects or problems and novel features will be made apparent from the following description and the accompanying drawings.

Solution to Problem

In a first aspect, a radio access network node includes at least one memory and at least one processor coupled to the at least one memory. The at least one processor is configured to act as a secondary node of dual connectivity for a radio terminal. The at least one processor is configured to transmit to the radio terminal, via a master node of the dual connectivity, a first Radio Resource Control (RRC) message indicating an execution condition of a conditional primary cell change of a primary cell of a secondary cell group from a first cell to a second cell. The at least one processor is further configured to receive, via the master node, a second RRC message that is transmitted from the radio terminal in response to a satisfaction of the execution condition.

In a second aspect, the radio terminal includes at least one memory and at least one processor coupled to the at least one memory. The at least one processor is configured to perform dual connectivity of a master cell group associated with a master node and a secondary cell group associated with a secondary node. The at least one processor is configured to receive from the secondary node, via the master node, a first radio Resource Control (RRC) message indicating an execution condition of a conditional primary cell change of a primary cell of the secondary cell group from a first cell to a second cell. The at least one processor is further configured to transmit a second RRC message form the radio terminal to the secondary node via the master node, in response to a satisfaction of the execution condition.

In a third aspect, a method for a radio access network node including:
(a) acting as a secondary node of dual connectivity for a radio terminal;

(b) transmitting to the radio terminal, via a master node of the dual connectivity, a first Radio Resource Control (RRC) message indicating an execution condition of a conditional primary cell change of a primary cell of a secondary cell group from a first cell to a second cell; and (c) receiving, via the master node, a second RRC message that is transmitted from the radio terminal in response to a satisfaction of the execution condition.

In a fourth aspect, a method for a radio terminal including:

(a) performing dual connectivity of a master cell group associated with a master node and a secondary cell group associated with a secondary node;

(b) receiving from the secondary node, via the master node, a first radio Resource Control (RRC) message indicating an execution condition of a conditional primary cell change of a primary cell of the secondary cell group from a first cell to a second cell; and (c) transmitting a second RRC message form the radio terminal to the secondary node via the master node, in response to a satisfaction of the execution condition.

In a fifth aspect, a radio access network node includes at least one memory and at least one processor coupled to the at least one memory. The at least one processor is configured to act as a secondary node of dual connectivity for a radio terminal. The at least one processor is configured to transmit to the radio terminal, via a master node of the dual connectivity, a first Radio Resource Control (RRC) message indicating an execution condition of a conditional primary cell change of a primary cell of a secondary cell group from a first cell to a second cell. The at least one processor is further configured to receive directly from the radio terminal, in the first cell or any secondary cell of the secondary cell group, an indication of an initiation or execution of the conditional primary cell change. The indication is transmitted from the radio terminal in response to a satisfaction of the execution condition.

In a sixth aspect, the radio terminal includes at least one memory and at least one processor coupled to the at least one memory. The at least one processor is configured to perform dual connectivity of a master cell group associated with a master node and a secondary cell group associated with a secondary node. The at least one processor is configured to receive from the secondary node, via the master node, a first radio Resource Control (RRC) message indicating an execution condition of a conditional primary cell change of a primary cell of the secondary cell group from a first cell to a second cell. The at least one processor is further configured to transmit directly to the secondary node, in the first cell or any secondary cell of the secondary cell group, an indication of an initiation or execution of the conditional primary cell change, in response to a satisfaction of the execution condition.

In a seventh aspect, a method for a radio access network node including:

(a) acting as a secondary node of dual connectivity for a radio terminal;

(b) transmitting to the radio terminal, via a master node of the dual connectivity, a Radio Resource Control (RRC) message indicating an execution condition of a conditional primary cell change of a primary cell of a secondary cell group from a first cell to a second cell; and (c) receiving directly from the radio terminal, in the first cell or any secondary cell of the secondary cell group, an indication of an initiation or execution of the conditional primary cell change, wherein the indication is transmitted from the radio terminal in response to a satisfaction of the execution condition.

In an eighth aspect, a method for a radio terminal including:

(a) performing dual connectivity of a master cell group associated with a master node and a secondary cell group associated with a secondary node;

(b) receiving from the secondary node, via the master node, a radio Resource Control (RRC) message indicating an execution condition of a conditional primary cell change of a primary cell of the secondary cell group from a first cell to a second cell; and (c) transmitting directly to the secondary node, in the first cell or any secondary cell of the secondary cell group, an indication of an initiation or execution of the conditional primary cell change, in response to a satisfaction of the execution condition.

In a ninth aspect, a program includes instructions (software codes) that, when loaded into a computer, cause the computer to perform the method according to the above-described third, fourth, seventh, or eighth aspect.

Advantageous Effects of Invention

According to the above-deceived aspects, it is possible to provide apparatuses, methods, and programs that contribute to allowing an SN to be aware of a satisfaction of an execution condition of a conditional PSCell change (or an initiation of the conditional PSCell change).

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP Long Term Evolution (LTE) systems and 5G systems. However, these embodiments may be applied to other radio communication systems supporting dual connectivity. Note that, the term "LTE" used in this specification includes enhancement/evolution of LTE and LTE-Advanced to provide interworking with the 5G System, unless otherwise specified. The 5G system includes a network deployment in which an LTE eNodeB (eNB) is connected to a 5G core network (5GC). This eNB may be referred to as a Next generation (ng)-eNB. The ng-eNB may also be referred to as an eNB/5GC, which means an eNB connected to a 5GC.

First Embodiment

Figure 1:
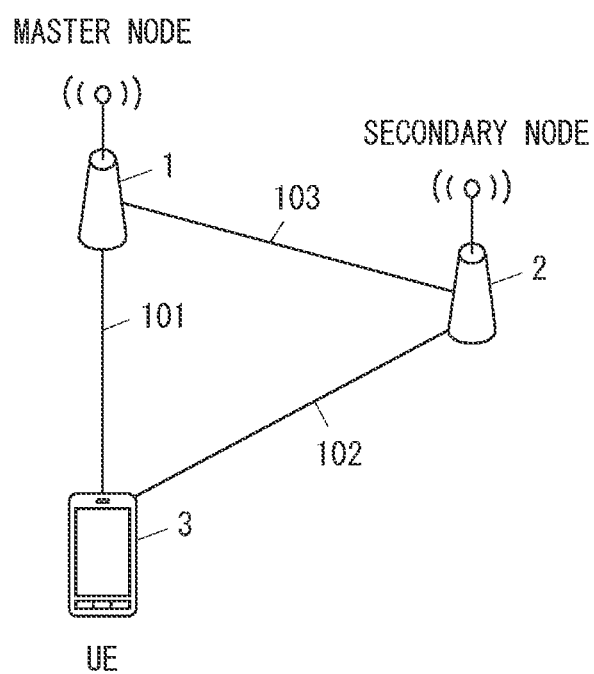
FIG. 1 is a diagram showing a configuration example of a radio communication network according to embodiments.

FIG. 1 shows a configuration example of a radio communication network according to the present embodiment. The radio communication network according to the present embodiment includes a master node (MN) 1 and a secondary node (SN) 2. The MN 1 and the SN 2 communicate with each other via an internode interface 103. A UE 3 communicates with the MN 1 and the SN 2 via air interfaces 101 and 102 and performs dual connectivity of a master cell group (MCG) and a secondary cell group (SCG). The MCG is a group of serving cells associated with (or served by) the MN 1, including the SpCell (i.e., Primary Cell (PCell)) and optionally one or more Secondary Cells (SCells). Meanwhile, the SCG is a group of serving cells associated with (or served by) the SN 2, including the primary cell of the SCG (i.e., Primary SCG Cell (PSCell)) and optionally one or more Secondary Cells (SCells). The PSCell is the Special Cell (SpCell) of the SCG.

Each of the MN 1 and the SN 2 may be an Evolved Universal Mobile Telecommunications System (UMTS) Terrestrial Radio Access Network (EUTRAN) node or a Next generation Radio Access Network (NG-RAN) node. The EUTRAN node may be an eNB or an en-gNB. The NG-RAN node may be a gNB or an ng-eNB. The Radio access Technology (RAT) of the MN 1 may be different from that of the SN 2.

The DC may be Multi-Radio Dual Connectivity (MR-DC). The MR-DC includes Evolved Universal Mobile Telecommunications System (UMTS) Terrestrial Radio Access (E-UTRA)-NR Dual Connectivity (EN-DC), NR-E-UTRA DC (NE-DC), NG-RAN EN-DC (NGEN-DC), and NR-NR DC (NR DC).

Figure 2:
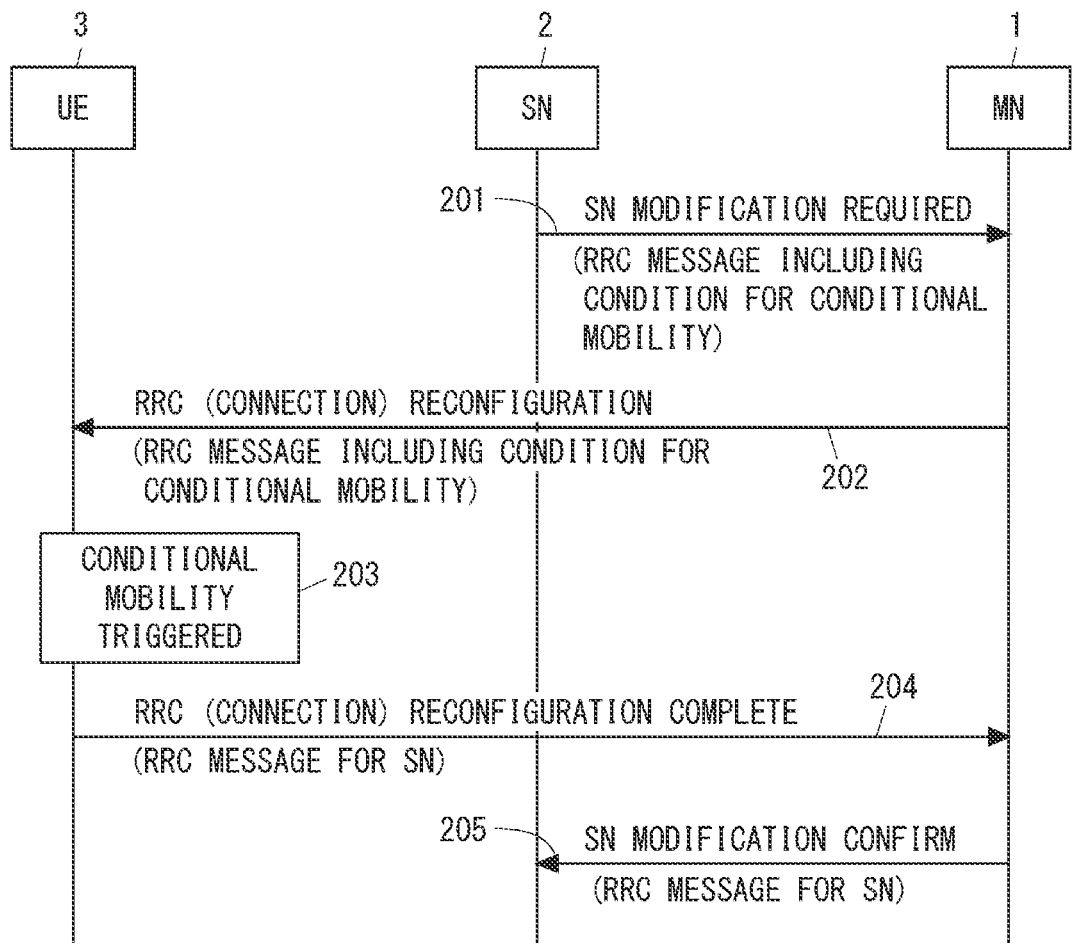
FIG. 2 is a sequence diagram showing an example of signaling according to a first embodiment.

FIG. 2 shows an example of signaling for conditional primary cell change (i.e., conditional PSCell Change) of the primary cell (i.e., PSCell) of the secondary cell group. As already described, the conditional PSCell Change can be referred to as a conditional Reconfiguration with sync (for PSCell change). FIG. 2 shows a case where the MN 1 (e.g., Master eNB (MeNB)) is involved in the PSCell Change in the MR-DC. Specifically, in the example in FIG. 2, RRC signaling transmitted between the SN 2 (e.g., Secondary gNB (SgNB)) and the UE 3 for the PSCell Change uses an SRB (e.g., SRB1) in the MCG served by the MN 1.

Before the procedure in FIG. 2, the SN 2 may generate an RRC message (e.g., RRCReconfiguration message) that includes a measurement configuration (e.g., MeasConfig) containing a reporting configuration (e.g., ReportConfig) for the conditional PSCell Change, and transmit it to the UE 3 via an MCG SRB served by the MN 1. The measurement configuration for the conditional PSCell Change enables early event triggering (i.e., lowering of a threshold which triggers a measurement report by the UE 3) for conditional PSCell Change determination. In addition, the UE 3 may send the measurement report to the SN 2 via the MN 1. The SN 2 may determine to perform the conditional PSCell Change to change the PSCell of the UE 3 from the current cell to another SCG cell or to another cell of the SN 2, based on the received measurement report.

In step 201, the SN 2 sends to the MN 1 an SN MODIFICATION REQUIRED message that contains an RRC message (e.g., RRC Reconfiguration message) of the SN RAT (e.g., NR) generated by the SN 2. The RRC message includes an initiation (or execution) condition of the conditional PSCell change (or the conditional Reconfiguration with sync for PSCell change). The initiation (or execution) condition of the conditional PSCell change includes, for example, a threshold and a corresponding time-to-trigger (TTT). Alternatively, the initiation (or execution) condition of the conditional PSCell change may be reception of an explicit execution instruction (e.g., predetermined signaling) from the network. In this case, the reception by the UE 3 of a configuration (e.g., radio parameters) used for receiving the execution instruction may implicitly indicate to the UE 3 that the initiation (or execution) condition of the conditional PSCell change is the reception of the execution instruction. In other words, if the UE 3 receives this configuration (e.g., radio parameters), the UE 3 may determine (or understand) that the initiation (or execution) condition of the conditional PSCell change associated therewith is the reception of the execution instruction (e.g., predetermined signaling).

The RRC message may also include a condition (e.g., offset) for the UE 3 to exit the conditional PSCell change, and a value of a validity timer. The value of the validity timer may indicate how long the resources of the candidate target cell (i.e., a candidate PSCell cell after the change) are valid. Alternatively, the value of the validity timer may indicate a period (or time) during which access to the candidate target cell is permitted, or a period (or time) during which the configuration for the conditional PSCell change is valid.

If one or both of data forwarding and an SN security key change need to be applied, the MN 1 may perform an MN initiated SN Modification procedure and apply a forwarding address or new SN security key information or both to the SN 2 using an SN Modification Request message. In response to it, the SN 2 may generate an RRC message (e.g., RRC Reconfiguration message) again and transmit this message to the MN 1 using an SN Modification Request Acknowledge message.

In step 202, the MN 1 performs an RRC reconfiguration procedure (e.g., LTE RRC Connection Reconfiguration procedure) of the MN RAT (e.g., LTE) via the MCG SRB, and forwards the RRC message of the SN RAT received from the SN 2 to the UE 3. The MN 1 may transmit to the UE 3, via the MCG SRB, an RRC message (e.g., LTE RRC Connection Reconfiguration message) of the MN RAT which carries the RRC message of the SN RAT received from the SN 2.

The UE 3 maintains the current PSCell configuration (i.e., the configuration before the change) and keeps using the current PSCell, even after receiving the RRC message of the SN RAT (step 202). If the execution condition of the conditional PSCell change (i.e., conditional Reconfiguration with sync) configured by the RRC message of the SN RAT (step 202) is satisfied (step 203), then the UE 3 sends to the MN 1 an RRC response message (e.g., LTE RRC Connection Reconfiguration Complete message) of the MN RAT containing an RRC response message (e.g., NR RRC Reconfiguration Complete message) of the SN RAT destined for the SN 2 (step 204). The UE 3 applies the new PSCell configuration and initiates access (i.e., a random access procedure) to the target PSCell.

In step 205, the MN 1 responds to the SN 2 with an SN MODIFICATION CONFIRM message. The SN MODIFICATION CONFIRM message contains the RRC response message (e.g., RRC Reconfiguration Complete message) of the SN RAT received from the UE 3.

In the procedure in FIG. 2, if the execution condition of the conditional PSCell change is satisfied, the UE 3 is operated to send the RRC response message (e.g., RRC Reconfiguration Complete message) destined for the SN 2 to the SN 2 via the MN 1. Thus, the RRC response message can be also used to report the initiation (or execution) of the conditional PSCell change to the SN 2. The SN 2 can detect the initiation of the conditional PSCell change by receiving the RRC response message.

The SN 2 may stop downlink data transfer to the UE 3 via the PSCell of before the change, in response to receiving the RRC response message from the UE 3. Put another way, the RRC response message from the UE 3 may trigger the SN 2 to stop downlink data transfer to the UE 3 via the PSCell of before the change. This allows the SN 2 to continue data transmission (downlink, uplink, or both) for the UE 3 in the current PSCell (i.e., the PSCell before the change) (and other serving cell(s) (i.e., SCG SCell(s)) of the current SCG) until just before the initiation (or execution) of the conditional PSCell change.

In the procedure in FIG. 2, The UE 3 may change the PSCell to one cell selected from the plurality of candidate target cells (i.e., candidate cells to be used as the PSCell after the change). For example, in step 203 in FIG. 2, the UE 3 may determine that the execution condition of the conditional PSCell change is satisfied for any one of the plurality of target cells. The UE 3 may then include information explicitly or implicitly indicating the selected candidate target cell (i.e., the cell for which the conditional PSCell Change has been triggered) in the RRC response message (step 204) of the SN RAT destined for the SN 2.

Figure 3:
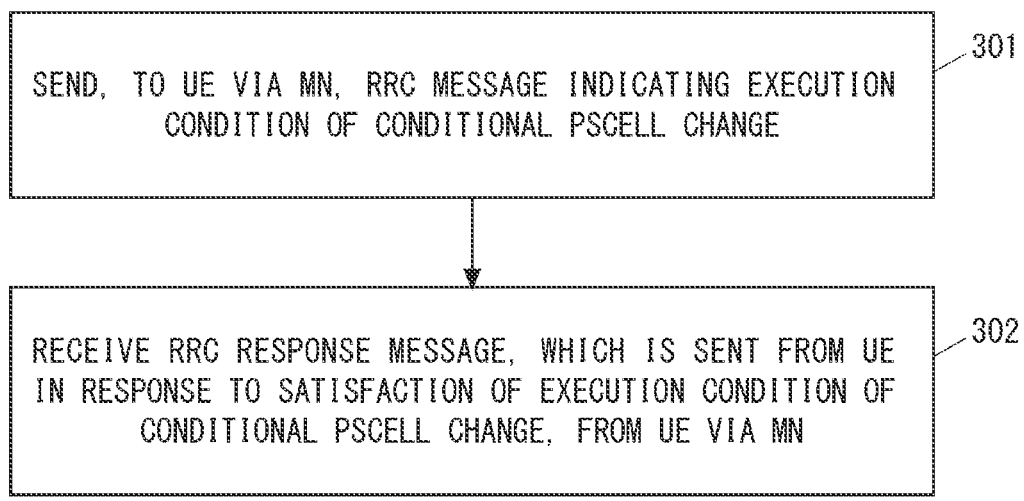
FIG. 3 is a flowchart showing an example of processing performed by a secondary node according to the first embodiment.

FIG. 3 is a flowchart illustrating an example of the operation of the SN 2. In step 301, the SN 2 sends to the UE 3 via the MN 1 an RRC message indicating an execution condition of a conditional PSCell change. In step 302, the SN 2 receives from the UE 3 via the MN 1 an RRC response message, which is sent by the UE 3 in response to the satisfaction of the execution condition of the conditional PSCell change.

After step 302, the SN 2 may stop downlink data transfer to the UE 3 via the PSCell of before the change, in response to the reception of the RRC response message from the UE 3.

Figure 4:
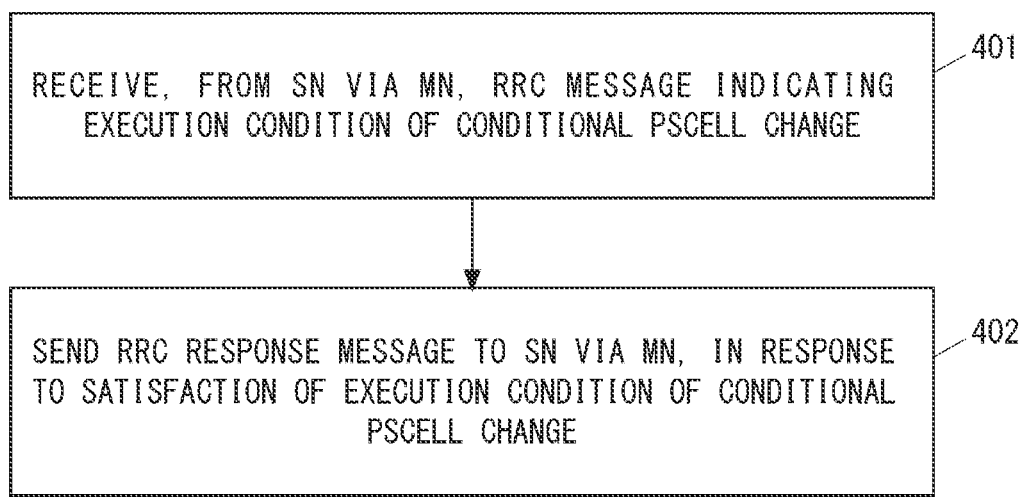
FIG. 4 is a flowchart showing an example of processing performed by a radio terminal according to the first embodiment.

FIG. 4 is a flowchart illustrating an example of the operation of the UE 3. In step 401, the UE 3 receives from the SN 2 via the MN 1 an RRC message indicating an execution condition of a conditional PSCell change. In step 402, the UE 3 sends an RRC response message to the SN 2 via the MN 1, in response to the satisfaction of the execution condition of the conditional PSCell change. The RRC response message may include information explicitly or implicitly indicating the selected candidate target cell (i.e., the cell for which the conditional PSCell Change has been triggered).

According to the operations of the MN 1, the SN 2, and the UE 3 described in the present embodiment, it is possible to allow the SN 2 to be aware of the satisfaction of the execution condition of the conditional PSCell change (or the initiation of the conditional PSCell change) in which RRC signaling between the SN 2 and the UE 3 is performed via the MN 1.

In the present embodiment, the UE 3 may further be operated as follows. If the condition (e.g., offset) of exiting the conditional PSCell change is satisfied or the above-described validity timer expires, the UE 3 may transmit, to the SN 2 via the MN 1, termination information indicating that due to this fact the conditional PSCell change has not been performed (non-execution) or the conditional PSCell change has failed. For example, the UE 3 may be operated as follows instead of the operation of step 204 in FIG. 2. If the above-described condition (e.g., offset) of exiting the conditional PSCell change is satisfied or the above-described validity timer expires, then the UE 3 may accordingly transmit to the MN 1 (e.g., MeNB) an RRC message (e.g., LTE RRC Connection Reconfiguration Complete message) of the MN RAT containing an RRC message (e.g., NR RRC Reconfiguration Complete) of the SN RAT. In this case, the RRC message of the MN RAT or the RRC message of the SN RAT contained therein may include the termination information indicating the non-execution or the failure of the conditional PSCell change. The MN 1 may send the RRC message of the SN RAT received from the UE 3 to the SN 2 (e.g., SgNB). Upon (or in response to) receiving the RRC message of the SN RAT from the MN 1, the SN 2 may release the prepared configuration and resources of the candidate target cell.

The termination information may further include information (e.g., a cause) for distinguishing by which of the satisfaction of the exit condition and the expiration of the validity timer the non-execution or the failure of the conditional PSCell change is caused.

In the case where there are a plurality of candidate target cells and either or both of the exit condition and the value of the validity timer are configured on a per-cell basis, the UE 3 may transmit the SN RAT RRC message containing the termination information in response to the exit condition being satisfied (or the expiration of the validity timer) for all the candidate target cells. Alternatively, the UE 3 may transmit the SN RAT RRC message containing the termination information in response to the exit condition being satisfied (or the expiration of the validity timer) for any one of the candidate target cells. In the latter case, the UE 3 may include, in the SN RAT RRC message, information indicating the candidate target cell(s) (e.g., the first one cell, or a plurality of cells for which the exit condition has been satisfied (or the validity timer has expired) simultaneously or almost (or substantially) simultaneously.

Second Embodiment

The present embodiment provides a specific example of the conditional PSCell change described in the first embodiment. The configuration example of a radio communication network according to the present embodiment may be similar to the example illustrated in FIG. 1. However, in the present embodiment, a cloud RAN (C-RAN) deployment is applied to an SN 2. In the C-RAN, a RAN node (e.g., eNB or NR gNodeB (gNB)) includes a Central Unit (CU) and one or more Distributed Units (DUs). The C-RAN may be referred to as Centralized RAN or CU-DU split architecture.

Figure 5:
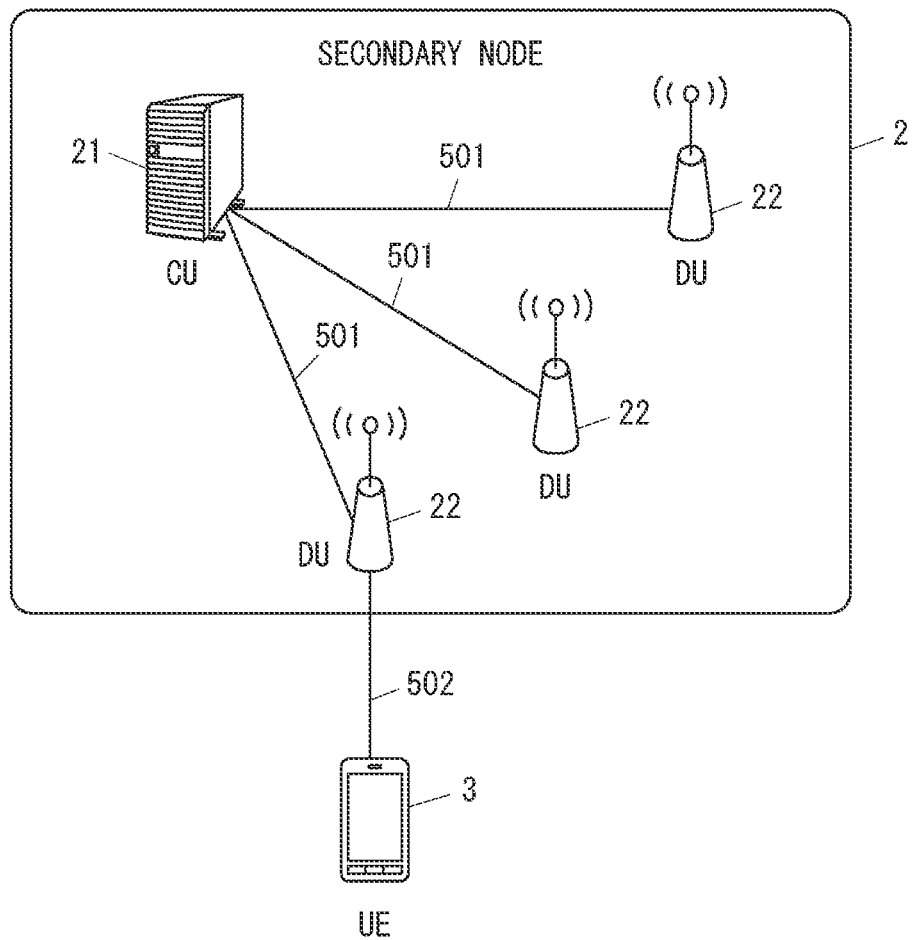
FIG. 5 is a diagram showing a configuration example of a secondary node according to a second embodiment.

FIG. 5 shows a configuration example of the SN 2 according to the present embodiment. The SN 2 in FIG. 5 includes a CU 21 and one or more DUs 22. The CU 21 and each DU 22 are connected to each other through an interface 501. A UE 3 is connected to at least one DU 22 through at least one air interface 502.

The CU 21 may be a logical node which hosts Radio Resource Control (RRC), Service Data Adaptation Protocol (SDAP), and Packet Data Convergence Protocol (PDCP) protocols of the gNB (or hosts the RRC and PDCP protocols of the gNB). The DU 22 may be a logical node which hosts Radio Link Control (RLC), Medium Access Control (MAC) and Physical (PHY) layers of the gNB. The interface 501 may be an F1 interface if the CU 21 is a gNB-CU and the DUs 22 are gNB-DUs.

The CU 21 may include a Control Plane (CP) Unit (e.g., a gNB-CU-CP) and one or more User Plane (UP) Units (e.g., gNB-CU-UPs).

Figure 6:
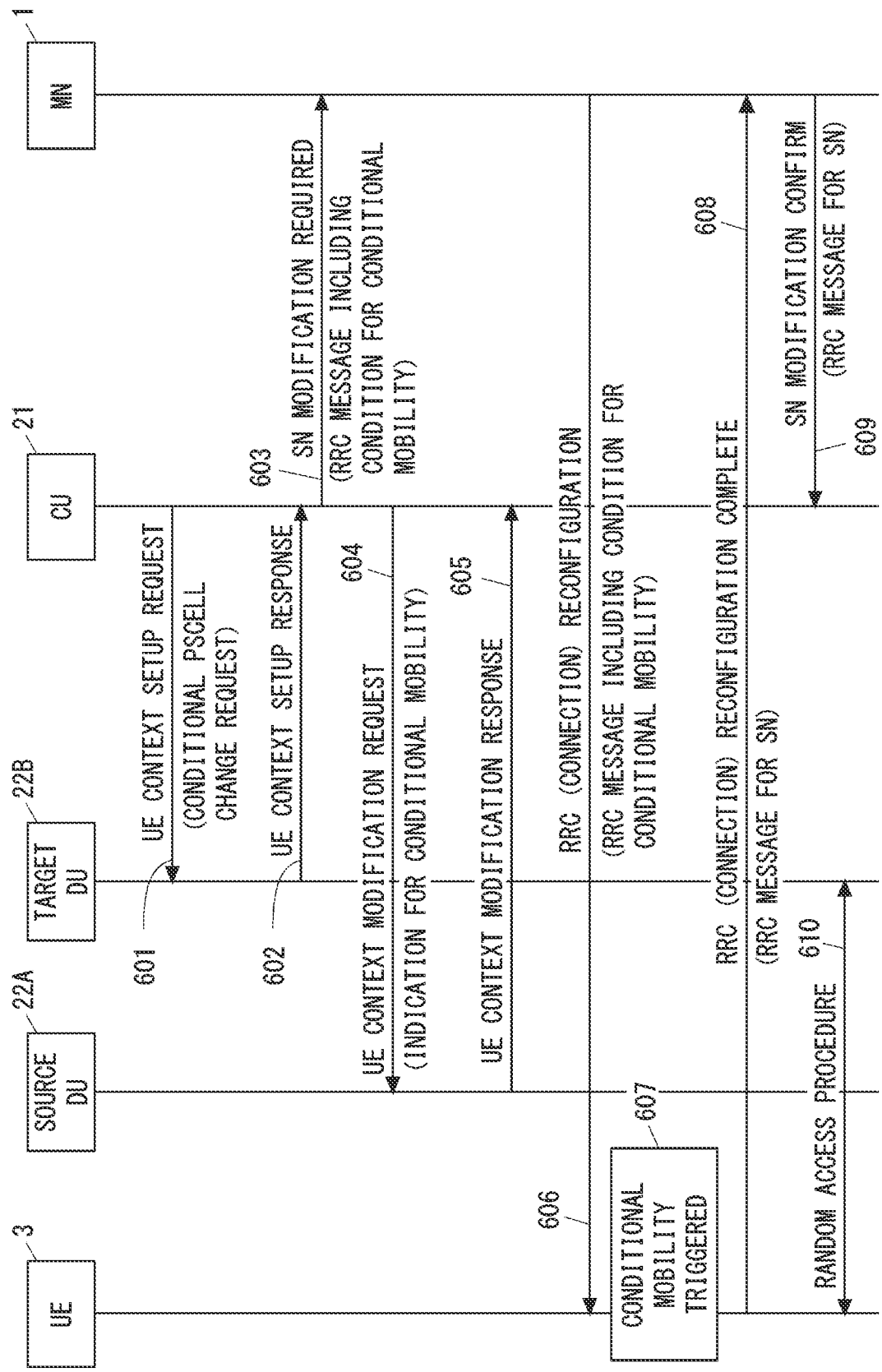
FIG. 6 is a sequence diagram showing an example of signaling according to the second embodiment.

FIG. 6 shows an example of an intra-CU inter-DU conditional PSCell Change procedure. As already described, the conditional PSCell Change can be referred to as a conditional Reconfiguration with sync (for PSCell change). FIG. 6 shows a case where an MN 1 (e.g., Master eNB (MeNB)) is involved in the PSCell Change in the MR-DC. In the example in FIG. 6, the PSCell for the UE 3 is changed from a cell of a source DU 22A to a cell of a target DU 22B. RRC signaling transmitted between the SN 2 (i.e., CU 21) and the UE 3 for the PSCell Change uses an SRB in the MCG served by the MN 1.

Before the procedure in FIG. 6, the SN 2 (i.e., CU 21) may generate an RRC message (e.g., RRCReconfiguration message) that includes a measurement configuration (e.g., MeasConfig) containing a reporting configuration (e.g., ReportConfig) for the conditional PSCell Change, and transmit it to the UE 3 via an MCG SRB served by the MN 1. The measurement configuration for the conditional PSCell Change enables early event triggering (i.e., lowering of a threshold which triggers a measurement report by the UE 3) for conditional PSCell Change determination. In addition, the UE 3 may send the measurement report to the SN 2 (i.e., CU 21) via the MN 1. The SN 2 (i.e., CU 21) may determine to perform the conditional PSCell Change to change the PSCell of the UE 3 from the current cell served by the SN to a cell served by another SN, based on the received measurement report.

In step 601, the CU 21 sends a UE CONTEXT SETUP REQUEST message to the target DU 22B in order to create a UE context and set up one or more bearers. The UE CONTEXT SETUP REQUEST message may request a configuration (e.g., CellGroupConfig) of a radio resource of the PSCell from the target DU 22B. To indicate that it is a conditional PSCell change request, a "CG-ConfigInfo" information element contained in a "CU to DU RRC Information" information element within the UE CONTEXT SETUP REQUEST message may be used. Alternatively, in order to indicate that it is a conditional mobility request, a new information element may be defined within the UE CONTEXT SETUP REQUEST message.

In step 602, the target DU 22B responds to the CU 21 with a UE CONTEXT SETUP RESPONSE message. In response to receiving the conditional PSCell Change request, the target DU 22B may determine whether the conditional PSCell Change is acceptable. The target DU 22B may include in the UE CONTEXT SETUP RESPONSE message an information element indicating whether the conditional PSCell Change is acceptable (step 602).

In step 603, the CU 21 sends to the MN 1 an SN MODIFICATION REQUIRED message containing an RRC message (e.g., RRC Reconfiguration message) generated by the CU 21. The RRC message indicates an initiation (or execution) condition (e.g., a threshold and a TTT) of the conditional PSCell change (or the conditional Reconfiguration with sync for PSCell change). The RRC message may also include a condition (e.g., offset) for the UE 3 to exit the conditional PSCell change and a value of a validity timer. The value of the validity timer may indicate how long the resources of the candidate target cell (i.e., candidate cell to be used as the PSCell after the change) are valid. Alternatively, the value of the validity timer may indicate a period (or time) during which access to the candidate target cell is permitted, or a period (or time) during which the configuration for the conditional PSCell change is valid.

More specifically, the CU 21 may determine the initiation condition of the conditional PSCell change and include it in the CG-ConfigInfo information element or a new information element contained in the UE CONTEXT SETUP REQUEST message (step 601). The target DU 22B may then generate a radio resource configuration (e.g., CellGroupConfig) containing the initiation condition of the conditional PSCell change and include it in the UE CONTEXT SETUP RESPONSE message (step 602). The CU 21 may generate an RRC message (e.g., NR RRCReconfiguration message) containing the received radio resource configuration (e.g., CellGroupConfig) and include it in the SN MODIFICATION REQUIRED message (step 603). The CU 21 may transmit one or both of the condition for the UE 3 to exit the conditional PSCell change and the value of the validity timer to the DU 22B in step 601, together with the initiation condition of the conditional PSCell change. The DU 22B may also include them in the radio resource configuration (e.g., CellGroupConfig), which contains the initiation condition of the conditional PSCell change, and transmit it to the CU 21.

Alternatively, the CU 21 may determine the initiation condition of the conditional PSCell change and include it in a new information element within the SN MODIFICATION REQUIRED message (step 603). The CU 21 may further include in this message one or both of the condition for the UE 3 to exit the conditional PSCell change and the value of the validity timer.

Further alternatively, the target DU 22B may determine the initiation condition of the conditional PSCell change. In this case, the target DU 22B may determine the initiation condition of the conditional PSCell change in response to the conditional PSCell change request (step 601) and include the determined initiation condition in the CellGroupConfig information element or a new information element within the UE CONTEXT SETUP RESPONSE message (step 602). After that, the CU 21 may generate an RRC message containing the CellGroupConfig information element or new information element, which contains the initiation condition of the conditional PSCell change, and include it in the SN MODIFICATION REQUIRED message (step 603). The DU 22 may further determine one or both of the condition for the UE 3 to exit the conditional PSCell change and the value of the validity timer and include them in the RRC message to the CU 21.

If one or both of data forwarding and an SN security key change need to be applied, the MN 1 may perform an MN initiated SN Modification procedure and apply a forwarding address or new SN security key information or both to the SN 2 (i.e., CU 21) using an SN Modification Request message.

In step 604, the CU 21 sends a UE CONTEXT MODIFICATION REQUEST message to the source DU 22A. The message includes an indication of the conditional PSCell change.

In step 605, the source DU 22A responds to the CU 21 with a UE CONTEXT MODIFICATION RESPONSE message.

In step 606, the MN 1 performs an RRC (Connection) Reconfiguration procedure via an MCG SRB and forwards the RRC message received from the CU 21 to the UE 3. The MN 1 may transmit to the UE 3 via the MCG SRB an RRC (Connection) Reconfiguration message carrying the RRC message received from the CU 21.

The UE 3 maintains the PSCell configuration before the change and keeps using the PSCell of before the change served by the source DU 22A, even after receiving the RRC message (step 606). If the execution condition of the conditional PSCell change (i.e., conditional Reconfiguration with sync) configured by the RRC message (step 606) is satisfied (step 607), then the UE 3 applies the new PSCell configuration and sends to the MN 1 an RRC (Connection) Reconfiguration Complete message which contains an RRC response message destined for the SN 2 (i.e., CU 21) (step 608). The UE 3 initiates access (i.e., random access procedure) to the target PSCell (i.e., the cell served by the target DU 22B) (step 610).

In step 609, the MN 1 responds to the SN 2 (i.e., CU 21) with an SN MODIFICATION CONFIRM message. The SN MODIFICATION CONFIRM message contains the RRC response message received from the UE 3.

In the procedure in FIG. 6, if the execution condition of the conditional PSCell change is satisfied, the UE 3 is operated to send the RRC response message destined for the SN 2 (i.e., CU 21) to the SN 2 (i.e., CU 21) via the MN 1. Thus, the RRC response message can be also used to report the initiation (execution) of the conditional PSCell change to the SN 2 (i.e., CU 21). The SN 2 (i.e., CU 21) can detect the initiation of the conditional PSCell change by receiving the RRC response message.

The SN 2 (i.e., CU 21) may stop downlink data transfer to the UE 3 via the source DU 22A, in response to receiving the RRC response message from the UE 3. Put another way, the RRC response message from the UE 3 may trigger the SN 2 (i.e., CU 21) to stop downlink data transfer to the UE 3 via the PSCell of before the change. This allows the SN 2 (i.e., CU 21) to continue data transmission (downlink, uplink, or both) for the UE 3 in the PSCell of before the change (and other serving cell(s) (i.e., SCG SCell(s)) of the current SCG) until just before the initiation (or execution) of the conditional PSCell change.

Alternatively, before the reception of the RRC response message from the UE 3, the SN 2 (i.e., CU 21) may stop downlink data transfer to the UE 3 via the source DU 22A in response to receiving from the source DU 22A a control message indicating downlink data not yet transmitted to the UE 3. This control data may be a message (or a frame, or a Protocol Data Unit (PDU)) transmitted to the CU 21 so as to indicate the downlink data not yet transmitted to the UE 3. More specifically, the control message may be a DOWN-LINK DATA DELIVERY STATUS (DDDS) frame. The DDDS frame may be a GTP-U (or F1-U) PDU.

According to the operations of the MN 1, the SN 2 (the CU 21, the source DU 22A, and the target DU 22B), and the UE 3 described in the present embodiment, it is possible to allow the SN 2 to be aware of the satisfaction of the execution condition of the conditional PSCell change (or the initiation of the conditional PSCell change) in which RRC signaling between the SN 2 and the UE 3 is performed via the MN 1. Although the present embodiment is described with reference to the intra-CU inter-DU conditional PSCell Change as an example, it can also be applied to or reused for an intra-CU intra-DU conditional PSCell Change.

In the present embodiment, as described in the first embodiment, when the condition (e.g., offset) of exiting the conditional PSCell change is satisfied or the above-described validity timer expires, the UE 3 may transmit, to the SN 2 (i.e., CU 21) via the MN 1, termination information indicating that due to this fact the conditional PSCell change has not been performed (non-execution) or the conditional PSCell change has failed. For example, the UE 3 may be operated as follows instead of the operation of step 608 in FIG. 6. If the above-described condition (e.g., offset) of exiting the conditional PSCell change is satisfied or the above-described validity timer expires, then the UE 3 may accordingly transmit to the MN 1 an RRC (Connection) Reconfiguration Complete message containing an RRC message destined for the SN 2 (i.e., CU 21). In this case, the RRC (Connection) Reconfiguration Complete or the RRC message included therein and destined for the SN 2 (i.e., CU 21) may include the termination information indicating the non-execution or the failure of the conditional PSCell change. In addition, the CU 21 may send, to the target DU 22B, information indicating that the conditional PSCell change to the cell of the target DU 22B was not performed or failed. The CU 21 may send this information via a CU To DU RRC Information IE or a new F1AP IE. In response to this information, the target DU 22B may release the prepared configuration and resources of the candidate target cell.

Third Embodiment

The present embodiment provides another example of the signaling for the conditional PSCell Change. The configuration example of a radio communication network according to the present embodiment may be similar to the example illustrated in FIG. 1.

In the present embodiment, an SN 2 sends an RRC message indicating an execution condition of the conditional PSCell change to a UE 3 via an MN 1. On the other hand, the SN 2 receives an indication of execution (or initiation) of the conditional PSCell change, which is sent by the UE 3 in response to satisfaction of the execution condition of the conditional PSCell change, directly from the UE 3 in the current PSCell (i.e., the PSCell before the change) or any SCG SCell.

In the present embodiment, the UE 3 receives the RRC message indicating the execution condition of the conditional PSCell change from the SN 2 via the MN 1. On the other hand, the UE 3 transmits the indication of execution (or initiation) of the conditional PSCell change directly to the SN 2 in the current PSCell (i.e., the PSCell before the change) or any SCG SCell, in response to satisfaction of the execution condition of the conditional PSCell change.

According to the operations of the MN 1, the SN 2 and the UE 3 described in the present embodiment, it is possible to allow the SN 2 to be aware of the satisfaction of the execution condition of the conditional PSCell change (or the initiation of the conditional PSCell change) in which RRC signaling between the SN 2 and the UE 3 is performed via the MN 1.

In addition, in the present embodiment, the indication of execution (or initiation) of the conditional PSCell change is transmitted from the UE 3 directly to the SN 2 without passing through the MN 1. This makes it possible to avoid a delay due to the intervention of the MN 1, thereby reducing the delay required for transmitting the indication from the UE 3 to the SN 2.

The indication of execution (or initiation) of the conditional PSCell change may be transmitted by using signaling of a layer lower than the RRC layer. More specifically, the indication may be transmitted by using signaling of the MAC layer or the physical layer. The indication may be Uplink Control Information (UCI) transmitted through a Physical Uplink Control Channel (PUCCH). Instead, the indication may be a MAC Control Element (CE).

The transmission of the indication of execution (or initiation) of the conditional mobility using signaling of a layer (e.g., the MAC layer or the physical layer) lower than the RRC layer is effective especially in the case where an SN initiated SN Modification with MN involvement procedure is used for the conditional PSCell Change. In the SN initiated SN Modification with MN involvement, the RRC signaling for the conditional mobility (e.g., conditional PSCell change) is transmitted via the MCG SRB. Thus, the transmission of the RRC signaling from the UE 3 to the SN 2 is delayed due to the intervention of the MN 1. In contrast, signaling of the MAC layer or the physical layer from the UE 3 to the SN 2 can be transmitted directly to the SN 2 via a physical channel of a cell served by the SN 2. Thus, by using signaling of a layer (e.g., the MAC layer or the physical layer) lower than the RRC layer to transmit the indication of the conditional mobility execution, the UE 3 can reduce the delay required for transmitting this indication from the UE 3 to the SN 2.

The SN 2 may determine in advance and notify the UE 3 of a configuration of a radio resource to be used for the indication of execution (or initiation) of the conditional PSCell change. The notification may be transmitted via RRC layer signaling via the MN 1.

In the case where there is a plurality of candidate target cells, the indication of execution (or initiation) of the conditional PSCell change may include information explicitly or implicitly indicating the selected candidate target cell (i.e., the candidate target cell for which the PSCell Change has been triggered).

Figure 7:
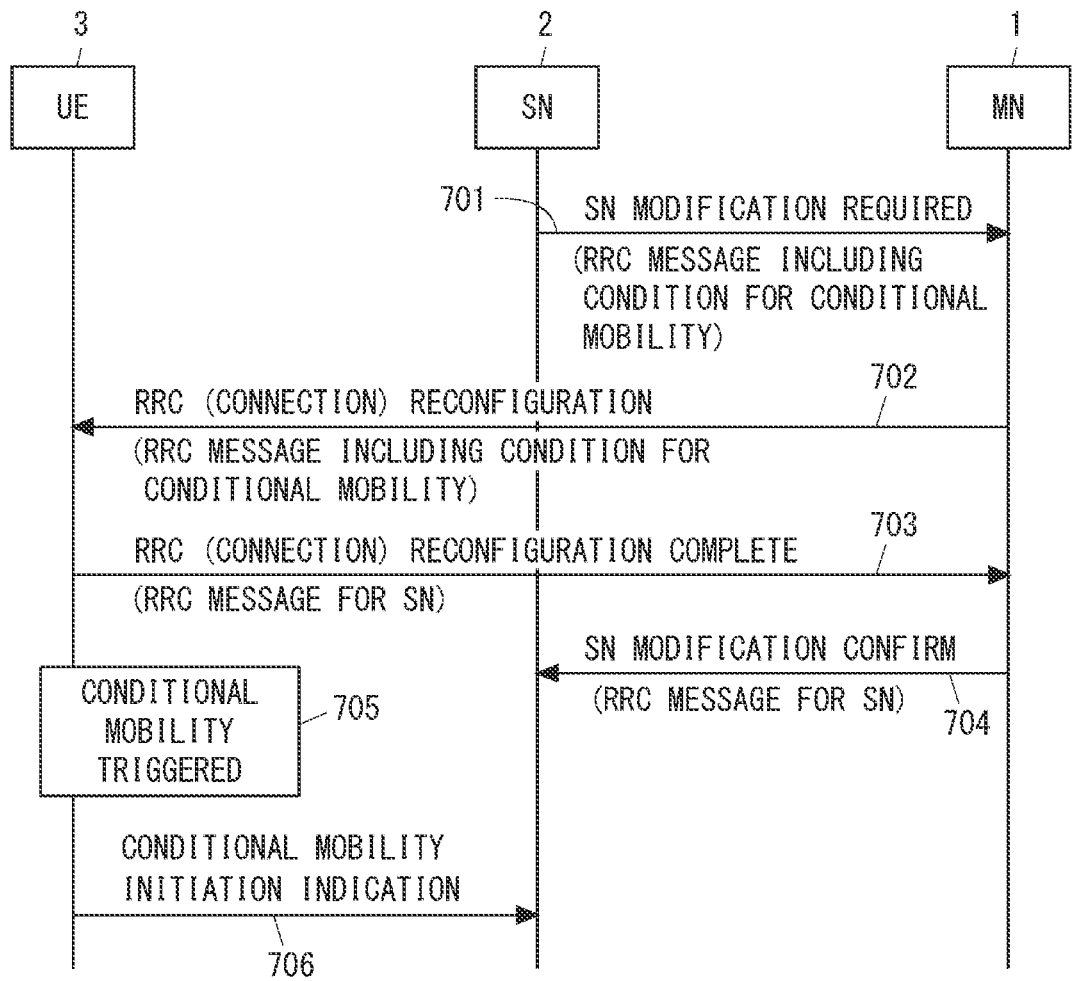
FIG. 7 is a sequence diagram showing an example of signaling according to a third embodiment.

The signaling in the present embodiment may be performed according to, for example, but not limited to, FIG. 7. FIG. 7 shows an example of the signaling for the conditional PSCell Change. In the example in FIG. 7, the MN 1 (e.g., Master eNB (MeNB)) is involved in the PSCell Change in the MR-DC. Specifically, in the example in FIG. 7, the RRC signaling transmitted between the SN 2 (e.g., Secondary gNB (SgNB)) and the UE 3 for the PSCell Change uses an SRB (e.g., SRB1) in the MCG served by the MN 1.

Processing in steps 701 and 702 in FIG. 7 is similar to that in steps 201 and 202 in FIG. 2.

In step 703, the UE 3 transmits to the MN 1 an RRC message (e.g., LTE RRC Connection Reconfiguration Complete message) of the MN RAT containing an RRC response message (e.g., NR RRC Reconfiguration Complete message) of the SN RAT destined for the SN 2.

In step 704, the MN 1 responds to the SN 2 with an SN MODIFICATION CONFIRM message. The SN MODIFICATION CONFIRM message contains the RRC response message (e.g., RRC Reconfiguration Complete message) of the SN RAT received from the UE 3.

The UE 3 maintains the current PSCell configuration (i.e., the configuration before the change) and keeps using the current PSCell, even after receiving the RRC message (step 702). If the execution condition of the conditional PSCell change (i.e., conditional Reconfiguration with sync) configured by the RRC message of the SN RAT (step 702) is satisfied (step 705), the UE 3 transmits an indication (or report) indicating execution or initiation of the conditional mobility (i.e., conditional PSCell Change) directly to the SN 2 in the current PSCell (or an SCG SCell). As described above, this indication (or report) may by transmitted via signaling of a layer (e.g., the MAC layer or the physical layer) lower than the RRC layer. The UE 3 applies the new PSCell configuration and initiates access (i.e., random access procedure) to the target PSCell.

The SN 2 may stop downlink data transfer to the UE 3 via the PSCell of before the change, in response to the reception of the indication (or report) (step 706). In other words, the indication (or report) from the UE 3 (step 706) may trigger the SN 2 to stop downlink data transfer to the UE 3 via the PSCell of before the change. This allows the SN 2 to continue data transmission (downlink, uplink, or both) for the UE 3 in the current PSCell (i.e., the PSCell before the change) (and SCG SCell(s)) until just before the initiation (or execution) of the conditional PSCell change.

In some implementations, the C-RAN deployment may be applied to the SN 2 (e.g., gNB), and the SN 2 (e.g., gNB) may include a CU (e.g., gNB-CU) and one or more DUs (e.g., gNB-DUs). The conditional PSCell change in the present embodiment may be applied to the PSCell change between different DUs in the SN 2 (e.g., intra-gNB-CU inter-gNB-DU PSCell change). In this case, if the execution condition of the conditional PSCell change (i.e., conditional Reconfiguration with sync) configured by the RRC message of the SN RAT is satisfied, the UE 3 may transmit the indication (or the report) indicating execution or initiation of the conditional mobility (i.e., conditional PSCell Change) directly to the source DU (e.g., gNB-DU) in the current PSCell. In response to receiving the indication (or report), the source DU (e.g., gNB-DU) may notify the CU (e.g., gNB-CU) that the conditional mobility has been executed or initiated in the UE. The source DU (e.g., gNB-DU) may send this notification by using an IE of an F1 message, or using RRC information (e.g., IE, message) contained in an DU to CU RRC container (e.g., DU To CU RRC Information).

Figure 8:
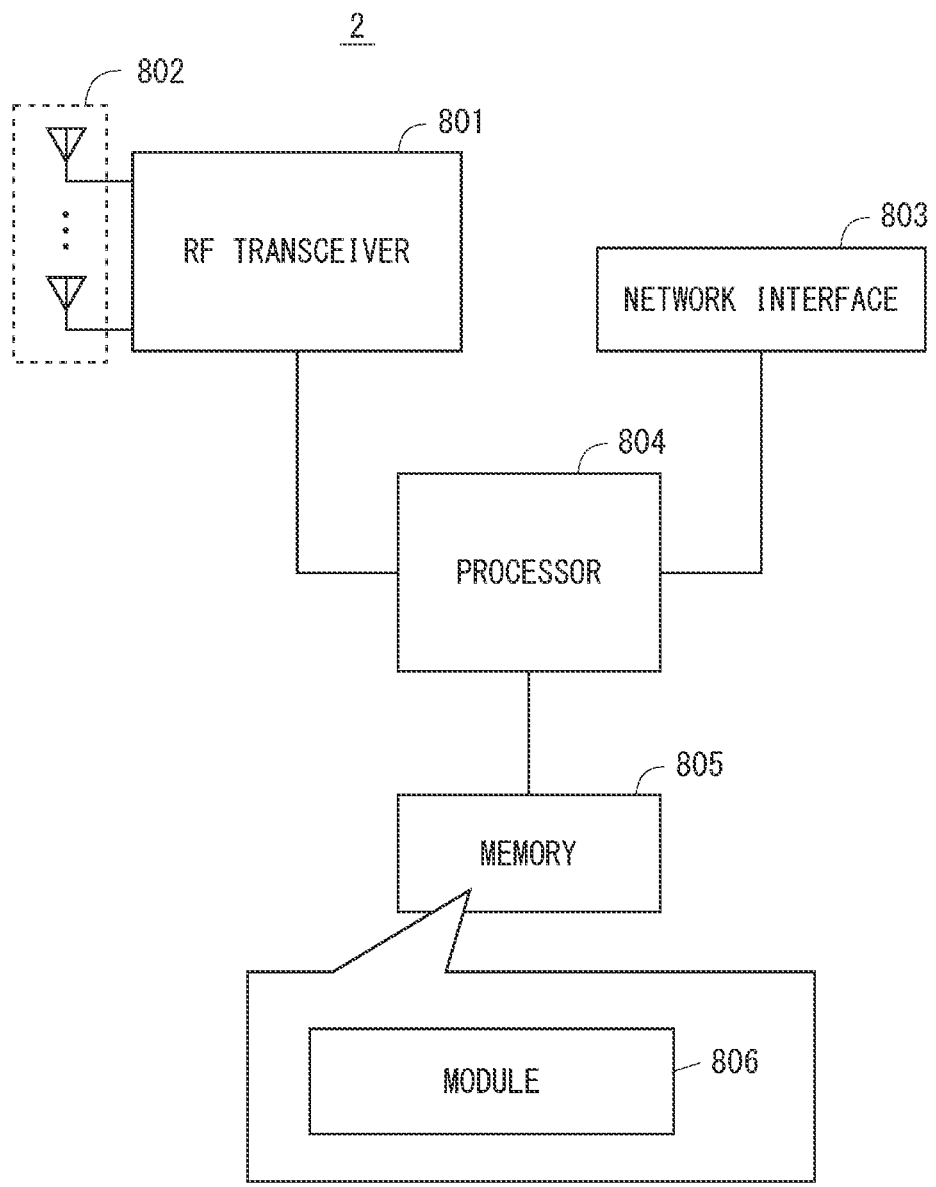
FIG. 8 is a block diagram showing a configuration example of a radio access network node according to embodiments.

The following provides configuration examples of the MN 1, the SN 2, and the UE 3 according to the above-described embodiments. FIG. 8 is a block diagram showing a configuration example of the SN 2 according to the above-described embodiments. The configuration of the MN 1 may be similar to that shown in FIG. 8. Referring to FIG. 8, the SN 2 includes a Radio Frequency transceiver 801, a network interface 803, a processor 804, and a memory 805. The RF transceiver 801 performs analog RF signal processing to communicate with UEs including the UE 3. The RF transceiver 801 may include a plurality of transceivers. The RF transceiver 801 is coupled to an antenna array 802 and the processor 804. The RF transceiver 801 receives modulated symbol data from the processor 804, generates a transmission RF signal, and supplies the transmission RF signal to the antenna array 802. The RF transceiver 801 also generates a baseband received signal based on a received RF signal received by the antenna array 802 and supplies the baseband received signal to the processor 804. The RF transceiver 801 may include an analog beamformer circuit for beam forming. The analog beamformer circuit includes, for example, a plurality of phase shifters and a plurality of power amplifiers.

The network interface 803 is used to communicate with network nodes (e.g., the MN1, and control nodes and transfer nodes of a core network). The network interface 803 may include, for example, a network interface card (NIC) conforming to the IEEE 802.3 series.

The processor 804 performs digital baseband signal processing (i.e., data-plane processing) and control-plane processing for radio communication. The processor 804 may include a plurality of processors. The processor 804 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 804 may include a digital beamformer module for beam forming. The digital beamformer module may include a Multiple Input Multiple Output (MIMO) encoder and a pre-coder.

The memory 805 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 805 may include a storage located apart from the processor 804. In this case, the processor 804 may access the memory 805 via the network interface 803 or an I/O interface (not shown).

The memory 805 may store one or more software modules (computer programs) 806 including instructions and data to perform processing by the SN 2 described in the above embodiments. In some implementations, the processor 804 may be configured to load the software modules 806 from the memory 805 and execute the loaded software modules, thereby performing processing of the SN 2 described in the above embodiments.

When the SN 2 is a CU (e.g., eNB-CU or gNB-CU), the SN 2 does not need to include the RF transceiver 801 (and the antenna array 802).

Figure 9:
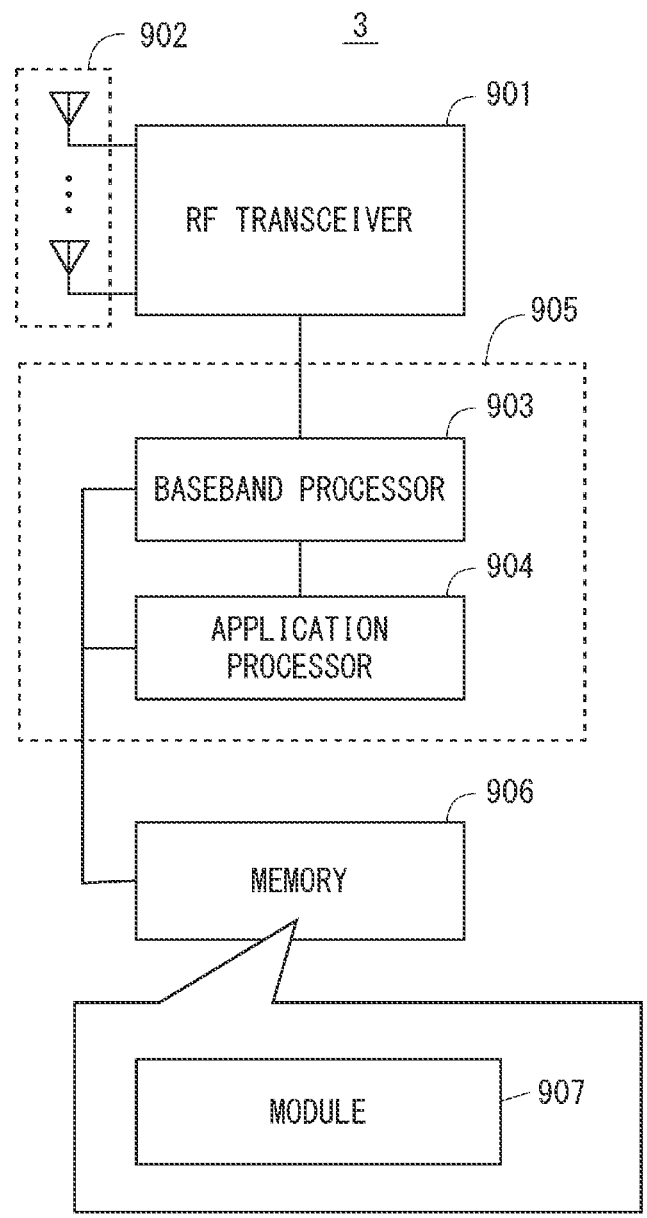
FIG. 9 is a block diagram showing a configuration example of a radio terminal according to embodiments.

FIG. 9 is a block diagram showing a configuration example of the UE 3. A Radio Frequency (RF) transceiver 901 performs analog RF signal processing to communicate with the MN 1 and the SN 2. The RF transceiver 901 may include a plurality of transceivers. The analog RF signal processing performed by the RF transceiver 901 includes frequency up-conversion, frequency down-conversion, and amplification. The RF transceiver 901 is coupled to an antenna array 902 and a baseband processor 903. The RF transceiver 901 receives modulated symbol data (or OFDM symbol data) from the baseband processor 903, generates a transmission RF signal, and supplies the transmission RF signal to the antenna array 902. The RF transceiver 901 also generates a baseband received signal based on a received RF signal received by the antenna array 902 and supplies the baseband received signal to the baseband processor 903. The RF transceiver 901 may include an analog beamformer circuit for beam forming. The analog beamformer circuit includes, for example, a plurality of phase shifters and a plurality of power amplifiers.

The baseband processor 903 performs digital baseband signal processing (i.e., data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 903 may include, for example, signal processing of a Service Data Adaptation Protocol (SDAP) layer, a Packet Data Convergence Protocol (PDCP) layer, a Radio Link Control (RLC) layer, a MAC layer, and a PHY layer. The control-plane processing performed by the baseband processor 903 may also include processing of a Non-Access Stratum (NAS) protocol, an RRC protocol, and MAC CEs.

The baseband processor 903 may perform MIMO encoding and pre-coding for beam forming.

The baseband processor 903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 904 described in the following.

The application processor 904 is also referred to as a CPU, an MPU, a microprocessor, or a processor core. The application processor 904 may include a plurality of processors (processor cores). The application processor 904 loads a system software program (Operating System (OS)) and various application programs (e.g., a call application, a WEB browser, a mailer, a camera operation application, and a music player application) from a memory 906 or from another memory (not shown) and executes these programs, thereby providing various functions of the UE 3.

In some implementations, as represented by a dashed line (905) in FIG. 9, the baseband processor 903 and the application processor 904 may be integrated on a single chip. In other words, the baseband processor 903 and the application processor 904 may be implemented in a single System on Chip (SoC) device 905. An SoC device may be referred to as a Large Scale Integration (LSI) or a chipset.

The memory 906 is a volatile memory, a non-volatile memory, or a combination thereof. The memory 906 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 906 may include, for example, an external memory device that can be accessed from the baseband processor 903, the application processor 904, and the SoC 905. The memory 906 may include an internal memory device that is integrated in the baseband processor 903, the application processor 904, or the SoC 905. The memory 906 may also include a memory in a Universal Integrated Circuit Card (UICC).

The memory 906 may store one or more software modules (computer programs) 907 including instructions and data to perform the processing by the UE 3 described in the above embodiments. In some implementations, the baseband processor 903 or the application processor 904 may load these software modules 907 from the memory 906 and execute the loaded software modules, thereby performing the processing of the UE 3 described in the above embodiments with reference to the drawings.

The control-plane processing and operations performed by the UE 3 described in the above embodiments can be achieved by elements other than the RF transceiver 901 and the antenna array 902, i.e., achieved by the memory 906, which stores the software module 907, and one or both of the baseband processor 903 and the application processor 904.

As described above with reference to FIGS. 8 and 9, each of the processors that the MN 1, the SN 2, and UE 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Embodiments

Each of the above-described embodiments may be used individually or two or more embodiments may be appropriately combined with one another. For example, the third embodiment may be executed independently from the first and second embodiments, contribute to solving objects or problems different from those of the first and second embodiments, and provide an effect different from that provided by the first and second embodiments.

The functions described as the conditional PSCell change in the above-described embodiments may be referred to as pre-conditioned PSCell change, pre-prepared PSCell change, delayed PSCell change, or the like.

In the embodiments described above, the UE 3 may execute the generation and transmission of an RRC message (e.g., RRCReconfigurationComplete) which is a response to an RRC message (e.g., NR RRCReconfiguration) of the SN RAT (e.g., NR) received via an RRC message (e.g., LTE RRCConnectionReconfiguration) of the MN RAT (e.g., LTE) as follows. Upon detecting that the RRC message of the MN RAT contains the RRC message of the SN RAT, the RRC layer of the MN RAT of the UE 3 passes it to the RRC layer of the SN RAT. The RRC layer of the SN RAT of the UE 3 decodes the RRC message of the SN RAT, and upon detecting that the conditional PSCell change is needed, determines whether the execution condition for the conditional PSCell change is satisfied. If the execution condition for the conditional PSCell change is satisfied, the RRC layer of the SN RAT generates a response RRC message (e.g., RRCReconfigurationComplete) of the SN RAT, and passes it to the RRC layer of the MN RAT. The RRC layer of the MN RAT generates an RRC message (e.g., RRCConnectionReconfigurationComplete) of the MN RAT containing the response RRC message received from the RRC layer of the SN RAT and transmits it to the MN 1. The MN 1 then forwards the response RRC message of the SN RAT to the SN 2.

On the other hand, if a condition of exiting the conditional PSCell change is satisfied or a validity timer expires, the RRC layer of the SN RAT of the UE 3 may generate a response RRC message (e.g., RRCReconfigurationComplete) containing information indicating that the conditional PSCell change was not successfully completed and then pass it to the RRC layer of the MN RAT. The RRC layer of the MN RAT generates an RRC message (e.g., RRCConnectionReconfigurationComplete) of the MN RAT containing the response RRC message received from the RRC layer of the SN RAT and transmits it to the MN 1. The MN 1 then forwards the response RRC message of the SN RAT to the SN 2. Note that, in the case where there is a plurality of candidate target cells (i.e., there are a plurality of candidates of the target PSCell), the RRC layer of the SN RAT may perform the above operation if the condition of exiting the conditional PSCell change is satisfied for any one of the candidate target cells or the validity timer expires for any one of the candidate target cells. Alternatively, the RRC layer of the SN RAT may execute the above operation if the condition of exiting the conditional PSCell change is satisfied for all the candidate target cells or the validity timer expires for all the candidate target cells.

In the conditional PSCell change in the embodiments described above, the UE 3 may handle a timer T30$x$ regarding the conditional PSCell change as follows. In the normal PSCell change, the UE 3 starts a timer T304 upon receiving the RRC message (e.g., RRC Reconfiguration including reconfigurationWithSync) of the instruction of the PSCell change. Alternatively, in the conditional PSCell change, the UE 3 may not immediately start the timer T30$x$ even when it received the RRC message (e.g., RRC Reconfiguration including reconfigurationWithSync for Conditional PSCell change) of the instruction of the conditional PSCell change. If the condition of the conditional PSCell change for a certain candidate target cell is satisfied, then the UE 3 starts the timer T30$x$ corresponding to this candidate target cell. After that, if a random access in the candidate target cell (e.g., SpCell) is successful, the UE 3 stops the timer T30$x$. Note that the conventional T304 may be used as the T30$x$, or a new timer may be provided as the T30$x$.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment;

elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; power transmission equipment; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017 Jan. 13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A radio access network node comprising:

at least one memory; and at least one processor coupled to the at least one memory and configured to:

act as a secondary node of dual connectivity for a radio terminal;

transmit to the radio terminal, via a master node of the dual connectivity, a first Radio Resource Control (RRC) message indicating an execution condition of a conditional primary cell change of a primary cell of a secondary cell group from a first cell to a second cell; and receive, via the master node, a second RRC message that is transmitted from the radio terminal in response to a satisfaction of the execution condition.

(Supplementary Note 2)

The radio access network node according to Supplementary Note 1, wherein the at least one processor is configured to detect an initiation of the conditional primary cell change by receiving the second RRC message.

(Supplementary Note 3)

The radio access network node according to Supplementary Note 1 or 2, wherein the at least one processor is configured to, in response to receiving the second RRC message, stop downlink data transfer to the radio terminal in a serving cell of the secondary cell group.

(Supplementary Note 4)

The radio access network node according to any one of Supplementary Notes 1 to 3, wherein the radio access network node is a central node of a base station, and the at least one processor is configured to, in response to receiving the second RRC message, stop downlink data transfer to the radio terminal via a first distributed unit that serves the first cell.

(Supplementary Note 5)

The radio access network node according to Supplementary Note 4, wherein the at least one processor is further configured to, in response to receiving, prior to the second RRC message, from the first distributed unit a control message indicating downlink data not yet transferred to the radio terminal, stop downlink data transfer via the first distributed unit to the radio terminal.

(Supplementary Note 6)

The radio access network node according to Supplementary Note 5, wherein the control message is a DOWNLINK DATA DELIVERY STATUS frame.

(Supplementary Note 7)

A radio terminal comprising:

at least one memory; and at least one processor coupled to the at least one memory and configured to:

perform dual connectivity of a master cell group associated with a master node and a secondary cell group associated with a secondary node;

receive from the secondary node, via the master node, a first radio Resource Control (RRC) message indicating an execution condition of a conditional primary cell change of a primary cell of the secondary cell group from a first cell to a second cell; and transmit a second RRC message form the radio terminal to the secondary node via the master node, in response to a satisfaction of the execution condition.

(Supplementary Note 8) The radio terminal according to Supplementary Note 7, wherein the second RRC message triggers the secondary node to stop downlink data transfer to the radio terminal in a serving cell of the secondary cell group.

(Supplementary Note 9)

A method for a radio access network node, the method comprising:

acting as a secondary node of dual connectivity for a radio terminal;

transmitting to the radio terminal, via a master node of the dual connectivity, a first Radio Resource Control (RRC) message indicating an execution condition of a conditional primary cell change of a primary cell of a secondary cell group from a first cell to a second cell; and receiving, via the master node, a second RRC message that is transmitted from the radio terminal in response to a satisfaction of the execution condition.

(Supplementary Note 10)

A method for a radio terminal, the method comprising:

performing dual connectivity of a master cell group associated with a master node and a secondary cell group associated with a secondary node;

receiving from the secondary node, via the master node, a first radio Resource Control (RRC) message indicating an execution condition of a conditional primary cell change of a primary cell of the secondary cell group from a first cell to a second cell; and transmitting a second RRC message form the radio terminal to the secondary node via the master node, in response to a satisfaction of the execution condition.

(Supplementary Note 11)

A program for causing a computer to perform a method for a radio access network node, the method comprising:

acting as a secondary node of dual connectivity for a radio terminal;

transmitting to the radio terminal, via a master node of the dual connectivity, a first Radio Resource Control (RRC) message indicating an execution condition of a conditional primary cell change of a primary cell of a secondary cell group from a first cell to a second cell; and receiving, via the master node, a second RRC message that is transmitted from the radio terminal in response to a satisfaction of the execution condition.

(Supplementary Note 12)

A program for causing a computer to perform a method for a radio terminal, the method comprising:

performing dual connectivity of a master cell group associated with a master node and a secondary cell group associated with a secondary node;

receiving from the secondary node, via the master node, a first radio Resource Control (RRC) message indicating an execution condition of a conditional primary cell change of a primary cell of the secondary cell group from a first cell to a second cell; and transmitting a second RRC message form the radio terminal to the secondary node via the master node, in response to a satisfaction of the execution condition.

(Supplementary Note 13)
A radio access network node comprising:
at least one memory; and
at least one processor coupled to the at least one memory and configured to:
act as a secondary node of dual connectivity for a radio terminal;
transmit to the radio terminal, via a master node of the dual connectivity, a Radio Resource Control (RRC) message indicating an execution condition of a conditional primary cell change of a primary cell of a secondary cell group from a first cell to a second cell; and
receive directly from the radio terminal, in the first cell or any secondary cell of the secondary cell group, an indication of an initiation or execution of the conditional primary cell change, wherein the indication is transmitted from the radio terminal in response to a satisfaction of the execution condition.

(Supplementary Note 14)
The radio access network node according to Supplementary Note 13, wherein the indication is transmitted by using signaling in a layer lower that an RRC layer.

(Supplementary Note 15)
The radio access network node according to Supplementary Note 14, wherein the signaling is signaling in a Medium Access Control (MAC) layer or a physical layer.

(Supplementary Note 16)
A radio terminal comprising:
at least one memory; and
at least one processor coupled to the at least one memory and configured to:
perform dual connectivity of a master cell group associated with a master node and a secondary cell group associated with a secondary node;
receive from the secondary node, via the master node, a radio Resource Control (RRC) message indicating an execution condition of a conditional primary cell change of a primary cell of the secondary cell group from a first cell to a second cell; and
transmit directly to the secondary node, in the first cell or any secondary cell of the secondary cell group, an indication of an initiation or execution of the conditional primary cell change, in response to a satisfaction of the execution condition.

(Supplementary Note 17)
The radio terminal according to Supplementary Note 16, wherein the at least one processor is configured to transmit the indication via signaling in a layer lower that an RRC layer.

(Supplementary Note 18)
The radio terminal according to Supplementary Note 17, wherein the signaling is signaling in a Medium Access Control (MAC) layer or a physical layer.

(Supplementary Note 19)
The radio terminal according to any one of Supplementary Notes 16 to 18, wherein
the secondary node comprises a central unit and one or more distributed units,
the at least one processor is configured to receive the RRC message from the central unit via the master node, and
the at least one processor is configured to transmit the indication to one of the one or more distributed units in the first cell or any secondary cell of the secondary cell group.

(Supplementary Note 20)
A method for a radio access network node, the method comprising:
acting as a secondary node of dual connectivity for a radio terminal;
transmitting to the radio terminal, via a master node of the dual connectivity, a Radio Resource Control (RRC) message indicating an execution condition of a conditional primary cell change of a primary cell of a secondary cell group from a first cell to a second cell; and
receiving directly from the radio terminal, in the first cell or any secondary cell of the secondary cell group, an indication of an initiation or execution of the conditional primary cell change, wherein the indication is transmitted from the radio terminal in response to a satisfaction of the execution condition.

(Supplementary Note 21)
A method for a radio terminal, the method comprising:
performing dual connectivity of a master cell group associated with a master node and a secondary cell group associated with a secondary node;
receiving from the secondary node, via the master node, a radio Resource Control (RRC) message indicating an execution condition of a conditional primary cell change of a primary cell of the secondary cell group from a first cell to a second cell; and
transmitting directly to the secondary node, in the first cell or any secondary cell of the secondary cell group, an indication of an initiation or execution of the conditional primary cell change, in response to a satisfaction of the execution condition.

(Supplementary Note 22)
A program for causing a computer to perform a method for a radio access network node, the method comprising:
acting as a secondary node of dual connectivity for a radio terminal;
transmitting to the radio terminal, via a master node of the dual connectivity, a Radio Resource Control (RRC) message indicating an execution condition of a conditional primary cell change of a primary cell of a secondary cell group from a first cell to a second cell; and
receiving directly from the radio terminal, in the first cell or any secondary cell of the secondary cell group, an indication of an initiation or execution of the conditional primary cell change, wherein the indication is transmitted from the radio terminal in response to a satisfaction of the execution condition.

(Supplementary Note 23)
A program for causing a computer to perform a method for a radio terminal, the method comprising:
performing dual connectivity of a master cell group associated with a master node and a secondary cell group associated with a secondary node;
receiving from the secondary node, via the master node, a radio Resource Control (RRC) message indicating an execution condition of a conditional primary cell change of a primary cell of the secondary cell group from a first cell to a second cell; and
transmitting directly to the secondary node, in the first cell or any secondary cell of the secondary cell group, an indication of an initiation or execution of the conditional primary cell change, in response to a satisfaction of the execution condition.

This application is based upon and claims the benefit of priority from Japanese Patent Application No. 2019-003563, filed on Jan. 11, 2019, the disclosure of which is incorporated herein in its entirety by reference.

REFERENCE SIGNS LIST

1 Master Node (MN)
2 Secondary Node (SN)
3 User Equipment (UE)
21 Central Unit (CU)
22 Distributed Unit (DU)
804 Processor
805 Memory
806 Modules
903 Baseband Processor
904 Application Processor
906 Memory
907 Modules

What is claimed is:

1. A method for a radio access network node, the method comprising:
   acting as a secondary node of dual connectivity for a radio terminal;
   transmitting to the radio terminal, via a master node of the dual connectivity, a first Radio Resource Control (RRC) message comprising an information element identifying an execution condition of a conditional primary cell change of a primary cell of a secondary cell group from a first cell to a second cell; and
   receiving, via the master node, a second RRC message that is transmitted from the radio terminal in response to a satisfaction of the execution condition.

2. The method according to claim 1, wherein the transmitting the first RRC message to the radio terminal via the master node of the dual connectivity comprises transmitting a MODIFICATION REQUIRED message to the master node of the dual connectivity, the MODIFICATION REQUIRED message containing therein the first RRC message, the first RRC message forwarded to the radio terminal from the master node of the dual connectivity.

3. A method for a radio terminal, the method comprising:
   performing dual connectivity of a master cell group associated with a master node and a secondary cell group associated with a secondary node;
   receiving, from the secondary node, via the master node, a first Radio Resource Control (RRC) message comprising an information element identifying an execution condition of a conditional primary cell change of a primary cell of the secondary cell group from a first cell to a second cell; and
   transmitting a second RRC message from the radio terminal to the secondary node via the master node, in response to a satisfaction of the execution condition.

4. The method according to claim 3, wherein the receiving the first RRC message comprises receiving, from the master node, the first RRC message, the first RRC message previously contained in a MODIFICATION REQUIRED message transmitted to the master node from the secondary node.

5. A method for a radio access network node, the method comprising:
   acting as a master node of dual connectivity for a radio terminal;
   receiving, from a secondary node of the dual connectivity a first Radio Resource Control (RRC) message comprising an information element identifying an execution condition of a conditional primary cell change of a primary cell of a secondary cell group from a first cell to a second cell;
   forwarding the first RRC message to the radio terminal;
   receiving a second RRC message that is transmitted from the radio terminal in response to a satisfaction of the execution condition; and
   sending the second RRC message to the secondary node.

6. The method according to claim 5, wherein the receiving the first RRC message comprises receiving a MODIFICATION REQUIRED message from the secondary node of the dual connectivity, the MODIFICATION REQUIRED message containing therein the first RRC message.

7. A radio access network node comprising:
   at least one memory; and
   at least one processor coupled to the at least one memory and configured to:
   act as a secondary node of dual connectivity for a radio terminal;
   transmit to the radio terminal, via a master node of the dual connectivity, a first Radio Resource Control (RRC) message comprising an information element identifying an execution condition of a conditional primary cell change of a primary cell of a secondary cell group from a first cell to a second cell; and
   receive, via the master node, a second RRC message that is transmitted from the radio terminal in response to a satisfaction of the execution condition.

8. The radio access network node according to claim 7, wherein the at least one processor is configured to detect an initiation of the conditional primary cell change by receiving the second RRC message.

9. The radio access network node according to claim 7, wherein the at least one processor is configured to, in response to receiving the second RRC message, stop downlink data transfer to the radio terminal in a serving cell of the secondary cell group.

10. The radio access network node according to claim 7, wherein
    the radio access network node is a central node of a base station, and
    the at least one processor is configured to, in response to receiving the second RRC message, stop downlink data transfer to the radio terminal via a first distributed unit that serves the first cell.

11. The radio access network node according to claim 10, wherein the at least one processor is further configured to, in response to receiving, prior to the second RRC message, from the first distributed unit a control message indicating downlink data not yet transferred to the radio terminal, stop downlink data transfer via the first distributed unit to the radio terminal.

12. The radio access network node according to claim 11, wherein the control message is a DOWNLINK DATA DELIVERY STATUS frame.

13. The radio access node according to claim 7, wherein the at least one processor is configured to transmit the first RRC message to the master node of the dual connectivity contained in a MODIFICATION REQUIRED message, the first RRC message forwarded to the radio terminal from the master node of the dual connectivity.

14. A radio terminal comprising:
    at least one memory; and
    at least one processor coupled to the at least one memory and configured to:
    perform dual connectivity of a master cell group associated with a master node and a secondary cell group associated with a secondary node;
    receive, from the secondary node, via the master node, a first Radio Resource Control (RRC) message comprising an information element identifying an execution condition of a conditional primary cell change of a primary cell of the secondary cell group from a first cell to a second cell; and transmit a second RRC message from the radio terminal to the secondary node via the master node, in response to a satisfaction of the execution condition.

15. The radio terminal according to claim 14, wherein the second RRC message triggers the secondary node to stop downlink data transfer to the radio terminal in a serving cell of the secondary cell group.

16. The radio terminal according to claim 14, wherein at least one processor is configured to receive, from the master node, the first RRC message, the first RRC message previously contained in a MODIFICATION REQUIRED message transmitted to the master node from the secondary node.

17. A non-transitory computer readable medium storing a program for causing a computer to perform a method for a radio access network node, the method comprising:

acting as a secondary node of dual connectivity for a radio terminal;

transmitting to the radio terminal, via a master node of the dual connectivity, a first Radio Resource Control (RRC) message comprising an information element identifying an execution condition of a conditional primary cell change of a primary cell of a secondary cell group from a first cell to a second cell; and receiving, via the master node, a second RRC message that is transmitted from the radio terminal in response to a satisfaction of the execution condition.

18. The non-transitory computer readable medium according to claim 17, wherein the transmitting the first RRC message comprises transmitting a MODIFICATION REQUIRED message to the master node of the dual connectivity, the MODIFICATION REQUIRED message containing therein the first RRC message, the first RRC message forwarded to the radio terminal from the master node of the dual connectivity.

19. A non-transitory computer-readable medium storing a program for causing a computer to perform a method for a radio terminal, the method comprising:

performing dual connectivity of a master cell group associated with a master node and a secondary cell group associated with a secondary node;

receiving from the secondary node, via the master node, a first Radio Resource Control (RRC) message comprising an information element identifying an execution condition of a conditional primary cell change of a primary cell of the secondary cell group from a first cell to a second cell; and transmitting a second RRC message from the radio terminal to the secondary node via the master node, in response to a satisfaction of the execution condition.

20. The non-transitory computer-readable medium according to claim 19, wherein the receiving the first RRC message comprises receiving a MODIFICATION REQUIRED message from the secondary node of the dual connectivity, the MODIFICATION REQUIRED message containing therein the first RRC message.

* * * * *